(12) United States Patent
Heinrich et al.

(10) Patent No.: US 12,491,590 B2
(45) Date of Patent: Dec. 9, 2025

(54) METHOD FOR REPAIRING WORKPIECE INVOLVES USING REQUIREMENT INFORMATION TO CHECK WHETHER SIMULATED PHYSICAL BEHAVIOR FULFILLS REQUIREMENT

(71) Applicant: Siemens Aktiengesellschaft, Munich (DE)

(72) Inventors: Christoph Heinrich, Donauwörth (DE); Christoph Ernst Ludwig, Munich (DE); Roland Rosen, Seefeld (DE); Christoph Wincheringer, Munich (DE); Nils Weinert, Munich (DE); Jan Fischer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 408 days.

(21) Appl. No.: 18/013,780

(22) PCT Filed: Jun. 22, 2021

(86) PCT No.: PCT/EP2021/066984
§ 371 (c)(1),
(2) Date: Dec. 29, 2022

(87) PCT Pub. No.: WO2022/002695
PCT Pub. Date: Jan. 6, 2022

(65) Prior Publication Data
US 2023/0294221 A1    Sep. 21, 2023

(30) Foreign Application Priority Data
Jul. 3, 2020   (EP) .................................... 20183996

(51) Int. Cl.
*B33Y 50/02* (2015.01)
*B23P 6/00* (2006.01)
(Continued)

(52) U.S. Cl.
CPC ............ *B23P 6/007* (2013.01); *B29C 64/393* (2017.08); *B33Y 10/00* (2014.12); *B33Y 50/02* (2014.12);
(Continued)

(58) Field of Classification Search
CPC ...................................................... B33Y 50/02
See application file for complete search history.

(56) References Cited

U.S. PATENT DOCUMENTS

| 2014/0277669 A1 | 9/2014 | Nardi et al. |
| 2016/0082664 A1 | 3/2016 | Snyder et al. |

(Continued)

FOREIGN PATENT DOCUMENTS

| CN | 104674210 A | * 6/2015 | ........... B23K 26/032 |
| CN | 109313672 A | 2/2019 | |

(Continued)

OTHER PUBLICATIONS

PCT International Search Report and Written Opinion of International Searching Authority mailed Sep. 21, 2021 corresponding to PCT International Application No. PCT/EP2021/066984 filed Jun. 22, 2021.

*Primary Examiner* — Suresh Suryawanshi
(74) *Attorney, Agent, or Firm* — Schmeiser, Olsen & Watts, LLP

(57) ABSTRACT

In order to repair a workpiece, a requirement specification about a requirement to be met by the workpiece and a numerical simulation model for simulating a physical behavior of the workpiece are imported. Furthermore, a current shape of the workpiece is detected by means of a sensor. Where a deviation of the current shape from a target shape S of the workpiece is identified, a respective physical behavior of the workpiece in its current shape and in a shape added to by means of a 3D printer are simulated using the (Continued)

Figure 1:
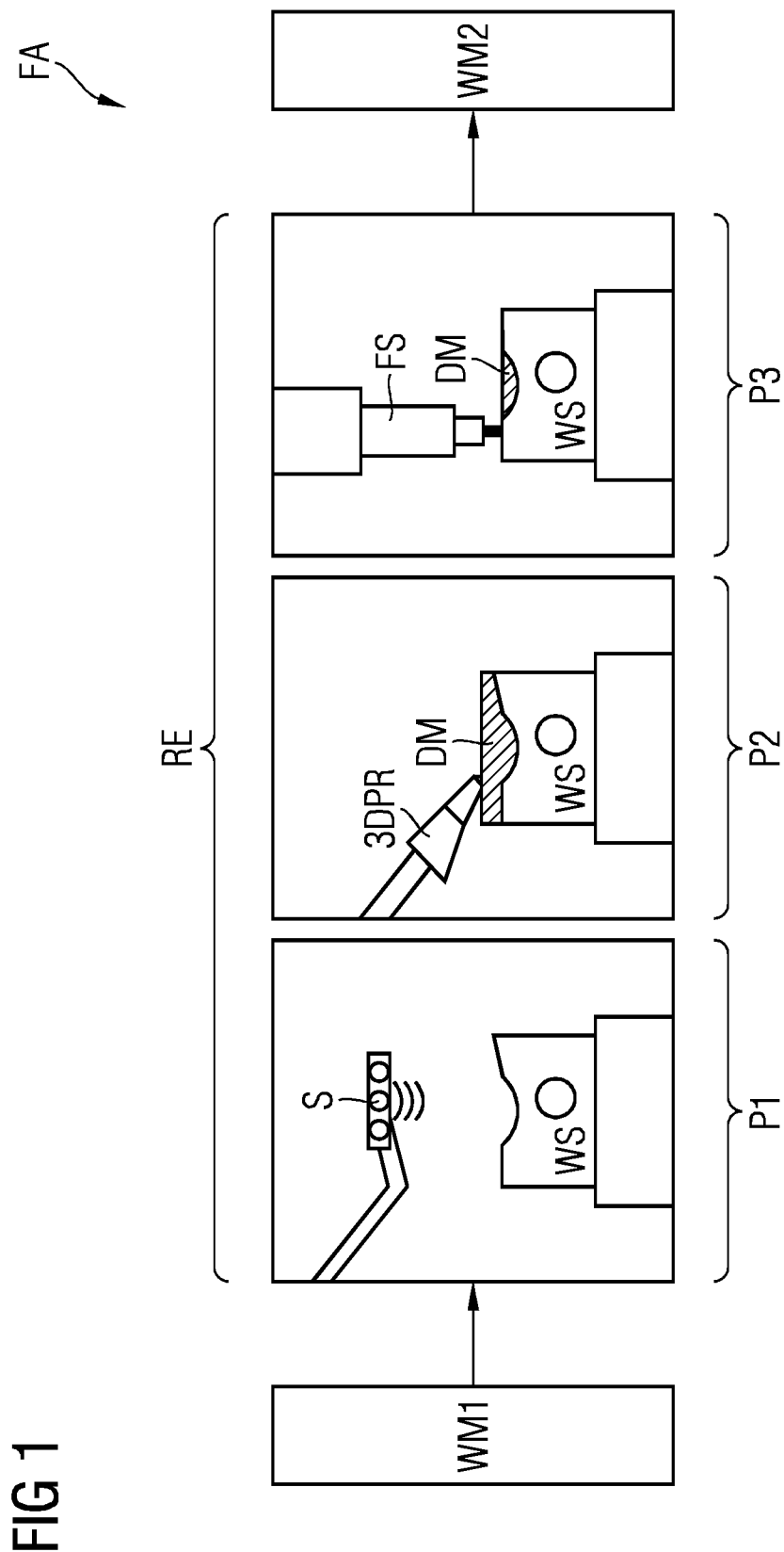

simulation model. Furthermore, a check is performed on the basis of the requirement specification to ascertain whether the simulated physical behavior meets the requirement. Depending on the outcome of the check, the workpiece is then either left in its current shape, added to by the 3D printer or discarded.

14 Claims, 2 Drawing Sheets

(51) Int. Cl.
*B29C 64/393* (2017.01)
*B33Y 10/00* (2015.01)
*B33Y 80/00* (2015.01)
*G06F 30/20* (2020.01)
*G06F 111/10* (2020.01)
*G06F 113/10* (2020.01)

(52) U.S. Cl.
CPC .............. *B33Y 80/00* (2014.12); *G06F 30/20* (2020.01); *G06F 2111/10* (2020.01); *G06F 2113/10* (2020.01)

(56) References Cited

U.S. PATENT DOCUMENTS

| | | |
|---|---|---|
| 2018/0297114 A1 | 10/2018 | Preston et al. |
| 2019/0134915 A1* | 5/2019 | Schmidt .................. G06T 17/00 |
| 2019/0137974 A1 | 5/2019 | Wever et al. |
| 2019/0138670 A1* | 5/2019 | Bandara ................... G06F 30/20 |
| 2020/0139631 A1* | 5/2020 | Buller ................ G05B 19/4099 |
| 2020/0166907 A1 | 5/2020 | Frederick |

FOREIGN PATENT DOCUMENTS

| | | | |
|---|---|---|---|
| CN | 111046597 A | | 4/2020 |
| EP | 3242179 A1 | * | 11/2017 |
| WO | 2019070644 A2 | | 4/2019 |
| WO | 2019180466 A1 | | 9/2019 |

* cited by examiner

METHOD FOR REPAIRING WORKPIECE INVOLVES USING REQUIREMENT INFORMATION TO CHECK WHETHER SIMULATED PHYSICAL BEHAVIOR FULFILLS REQUIREMENT

CROSS-REFERENCE TO RELATED APPLICATIONS

This application claims priority to PCT Application No. PCT/EP2021/066984, having a filing date of Jun. 22, 2021, which claims priority to EP Application No. 20183996.6, having a filing date of Jul. 3, 2020, the entire contents both of which are hereby incorporated by reference.

FIELD OF TECHNOLOGY

The following relates to a method and arrangement for repairing a workpiece.

BACKGROUND

During the production of products in a manufacturing facility, many different processing steps are often carried out on a respective workpiece, e.g., drilling, molding, grinding, or milling, until the workpiece achieves a predetermined shape. The workpiece in general passes through various tool stations of the manufacturing facility for this purpose, in order to be subjected to a quality control at the end or after a specific processing step, for example, by visual inspection or by automated review measurements.

If a tolerance range is exceeded in the quality control, an expert has decided up to this point in many cases whether the workpiece is to be repaired or not. For repair, the workpiece is then generally transferred to a separate repair process, in order to be checked again after completing the repair process and if necessary to be integrated back into the manufacturing process. Such a procedure is often linked to a high level of manual effort, however.

SUMMARY

An aspect relates to provide a method and arrangement for repairing a workpiece, which may be integrated flexibly in an automated sequence of a manufacturing process.

To repair a workpiece, a requirement specification about a requirement to be met by the workpiece and a numerical simulation model for simulating a physical behavior of the workpiece are input. In particular a mechanical, electric, static, or dynamic behavior, an elasticity, a stress, a mechanical or electrical resilience, and/or a natural frequency of the workpiece can be simulated for this purpose as a physical behavior. Furthermore, a present shape of the workpiece is detected by means of a sensor. If a deviation of the present shape from an intended shape of the workpiece is established, a respective physical behavior of the workpiece in the present shape and in a shape supplemented by means of a 3D printer is simulated on the basis of the simulation model. Furthermore, it is checked on the basis of the requirement specification whether the respective simulated physical behavior meets the requirement. Depending on the result of the check, the workpiece is then either left in the present shape, supplemented by the 3D printer, or discarded.

To execute the method according to embodiments of the invention, an arrangement for repairing a workpiece, a computer program product (non-transitory computer readable storage medium having instructions, which when executed by a processor, perform actions), and a computer-readable, nonvolatile memory medium are provided.

The method according to embodiments of the invention and the arrangement according to embodiments of the invention can be embodied or implemented, for example, by means of one or more computers, processors, application-specific integrated circuits (ASIC), digital signal processors (DSP), and/or so-called "field programmable gate arrays" (FPGA).

By embodiments of the invention, a quality check, a decision about an ability to repair a workpiece, and possibly its automatic repair can be functionally combined and integrated in a uniform manner in existing automated manufacturing processes. Such an integration requires no or only few changes to existing manufacturing facilities in many cases. In addition, upon an evaluation of a quality or an ability to repair a workpiece, not only its geometric properties can be checked, but also its effects on a physical behavior of the workpiece.

According to one advantageous embodiment of the invention, in the case of a supplementation of the workpiece by the 3D printer, subtractive processing of the workpiece can also be carried out, in order to convert the workpiece into the supplemented shape. The subtractive processing can comprise for this purpose in particular machining, milling, drilling, grinding, cutting, and/or turning. For example, parts of the workpiece protruding beyond the intended shape or protruding 3D printing material can be removed by the subtractive processing. Furthermore, a non-protruding part of the workpiece can also be subtractively removed in order to enable or stabilize a following additive application. The sequence in which an additive supplementation and a subtractive processing are carried out does not have to be predetermined for this purpose and can be ascertained in particular depending on the simulation results. The check as to whether the simulated physical behavior meets the requirement can in particular take place after a respective additive and/or subtractive processing step.

According to a further advantageous embodiment of the invention, a difference body between the intended shape and the present shape can be ascertained. A grid model of the intended shape can be adapted to the present shape on the basis of the difference body. The simulation of the physical behavior of the workpiece in the present shape can then be carried out on the basis of the adapted grid model. By way of such a difference body between a first and a second geometric shape, in particular a first spatial area, in which both geometric shapes overlap, a second spatial area, which is located inside the first but outside the second geometric shape, and a third spatial area, which is located outside the first but inside the second geometric shape can be specified. The difference body can be represented by data in an STL format (STL: stereolithography) or in a CAD format (CAD: computer-aided design).

In particular, a grid model of the intended shape can be converted by morphing into a grid model of the present shape and/or into a grid model of the supplemented shape. The morphing can be executed by geometric interpolation of grid points of the grid models and/or by geometric distortion of a grid model.

According to a further advantageous embodiment of the invention, a spatial area to be filled using 3D printing material can be ascertained in a grid model of the supplemented shape. A physical property of the 3D printing material can be associated specifically by location with the ascertained spatial area. In the simulation of the physical behavior of the workpiece in the supplemented shape, the physical property of the 3D printing material can then be taken into consideration specifically by location. The physical property of the 3D printing material can relate, for example, to its elasticity, its strength, its electrical or thermal conductivity, and/or its specific weight. In this way, it can be taken into consideration that a workpiece supplemented using 3D printing material behaves differently or reacts differently than a workpiece made of original material.

According to one advantageous refinement of embodiments of the invention, a digital twin of the workpiece can be generated by means of the simulation model. The digital twin can be adapted here to a presently ascertained shape of the workpiece, to an additively supplemented or subtractively processed shape of the workpiece, and/or specifically by location to a physical property of a 3D printing material. The adaptation of the digital twin takes place progressively during the additive supplementation and/or a subtractive processing of the workpiece. By means of the digital twin, a state of the workpiece and in particular also properties of the workpiece which are not directly measurable or are not measured can be ascertained in real time and taken into consideration in the checking and/or repair of the workpiece.

Furthermore, to convert the workpiece into the supplemented form, a sequence of additive supplementation steps and subtractive processing steps, a tool path, and/or a tool can be ascertained in dependence on the present shape, the supplemented shape, and/or a simulation result. In this way, in particular a repair strategy can be generated for the workpiece, which is optimized with respect to the requirement placed on the workpiece.

In addition, processing steps of a manufacturing chain provided subsequently for the workpiece can be modified in dependence on the present shape, the supplemented shape, and/or a simulation result. Thus, for example, in the case of an additively supplemented workpiece, a subsequent coating procedure can be modified in order to compensate for a surface roughness of a 3D printing material different from the original material.

BRIEF DESCRIPTION

Figure 2:
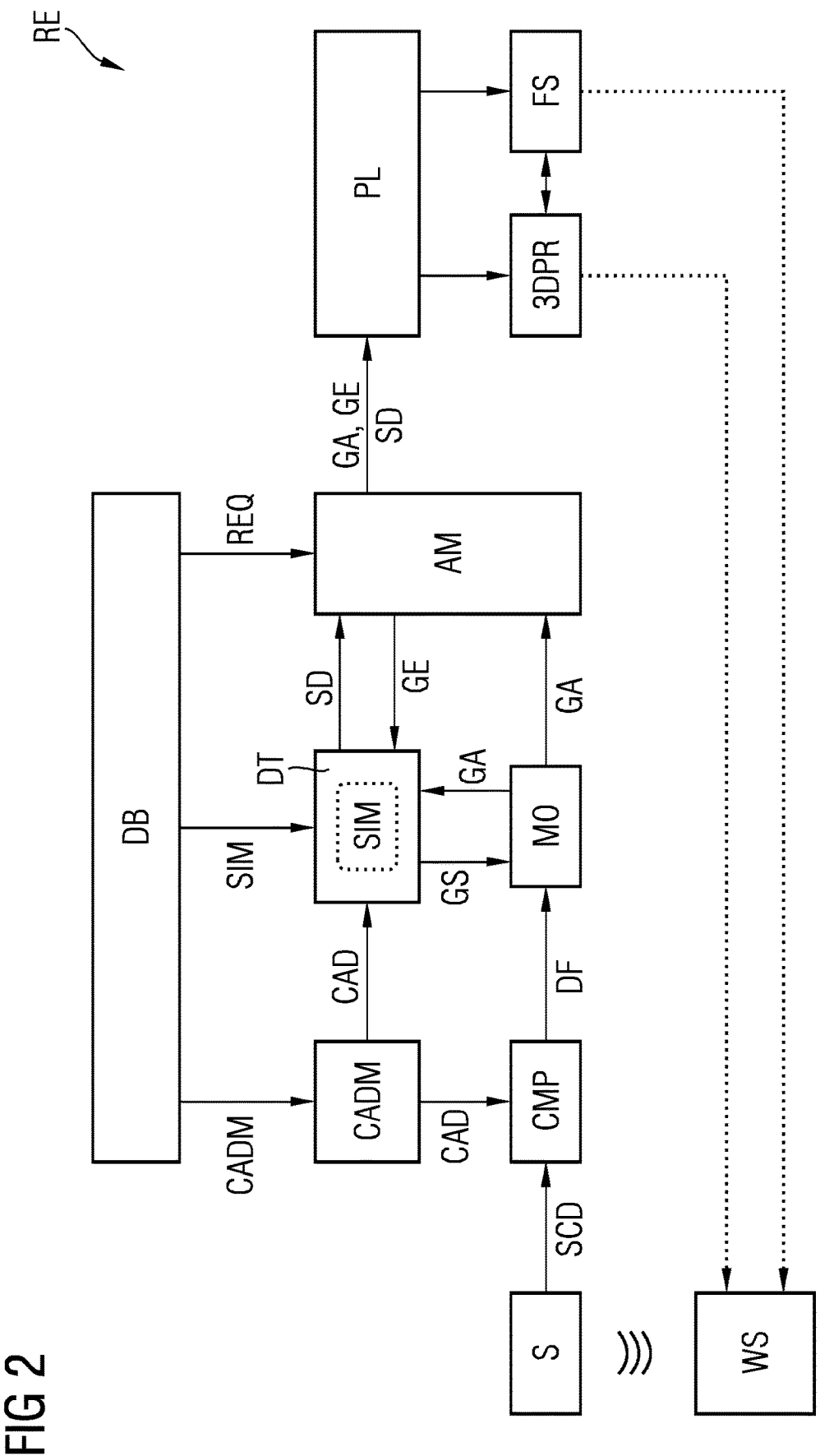

Some of the embodiments will be described in detail, with reference to the following figures, wherein like designations denote like members, wherein:

FIG. 1 shows a repair unit according to embodiments of the invention, which is integrated in a manufacturing facility, in various repair phases; and FIG. 2 shows a block diagram of the repair unit.

DETAILED DESCRIPTION

Insofar as identical or corresponding reference signs are used in the figures, identical or corresponding entities are designated in this way, which are implemented or realized as described in conjunction with the relevant figures.

FIG. 1 shows a schematic illustration of a repair unit RE, which is integrated in a manufacturing facility FA and its manufacturing process, as an arrangement according to embodiments of the invention for repairing a workpiece WS. The manufacturing facility FA includes, in addition to the repair unit RE, a plurality of machine tools for processing workpieces.

In the present exemplary embodiment, only a first machine tool WM1, which transfers the workpiece WS to the repair unit RE, and a second machine tool WM2, which accepts the workpiece WS from the repair unit RE, are explicitly shown in FIG. 1 for reasons of clarity. The second machine tool WM2 is optional in this case. Without the second machine tool WM2, the workpiece WS can also be output as a finished workpiece directly after passing through the repair unit RE. In this case, the repair unit RE can be used for automatic quality control at the end of a manufacturing process and optionally for automatic repair or finishing of the workpiece WS.

Various phases P1, P2, and P3 of a repair of the workpiece WS by the repair unit RE are schematically shown in FIG. 1.

In a first phase P1, a present shape of the workpiece WS is detected by means of a sensor system S. The sensor system S comprises one or more contactless sensors. In the present exemplary embodiment, the sensor system S in particular comprises a scanner, which acquires the present shape of the workpiece WS by means of a laser, by means of a projection of structured light, or by means of one or more cameras.

The acquired present shape of the workpiece WS is then compared to an intended shape of the workpiece WS, which is supposed to be present after processing by the machine tool WM1. The intended shape can be specified for this purpose in particular by a predetermined CAD model of the workpiece WS.

If a deviation between the present shape and the intended shape of the workpiece WS is established in this comparison, the repair unit RE simulates, by means of a numeric simulation model of the workpiece WS, how it would behave in a physical aspect in the present shape. In particular, for this purpose a mechanical resilience, a dynamic behavior, an elasticity, natural frequencies, a cooling functionality, and/or a thermal behavior of the workpiece WS can be simulated. In dependence thereon it is checked whether and/or to what extent the simulated physical behavior meets predetermined technical requirements placed on the workpiece WS. The latter can in particular comprise requirements for a spatial structure, for dimensions, for a resilience, for an elasticity, for a durability, for a dynamic behavior, for natural frequencies, for physical, chemical, thermal, or electrical properties, and/or for a function of the workpiece WS or other boundary conditions or secondary conditions required for the workpiece. In particular, the requirements can relate to observing tolerance ranges for predetermined physical properties of the workpiece WS. In addition, requirements for subsequent machine tools of the manufacturing facility FA on the workpiece WS can be taken into consideration.

If the technical requirements are met by the workpiece WS or if no deviation from the intended shape has been established, the workpiece WS is left in the present shape and passed on to the machine tool WM2 for further processing. Alternatively, the workpiece WS is output directly as a finished workpiece.

If the requirements are not met by the workpiece WS in the present shape, it is checked on the basis of the simulation model whether and/or to what extent the workpiece WS would meet the requirements placed after a repair by additive and/or subtractive processing.

For this purpose, a supplemented shape of the workpiece WS meeting the requirements is ascertained, which can be created by additive application of 3D printing material and possibly by additional subtractive processing. The subtractive processing can be provided for this purpose in order, for example, to first mill out a crack or another flaw on the workpiece WS so that the 3D printing material adheres as well as possible, a predetermined minimum layer thickness of the additive application is not undershot, the relevant point is accessible for a 3D printer, and/or the relevant point can be filled as well as possible by the 3D printing material. Subtractive processing steps can also be provided if the workpiece WS extends beyond an intended shape in the present shape or after an additive application.

On the basis of the present shape of the workpiece WS and the supplemented shape, a spatial area is ascertained which is to be filled using 3D printing material in the supplemented shape. This spatial area is associated with one or more physical properties of the 3D printing material specifically by location. The physical properties can relate in this case in particular to a strength, an elasticity, a specific weight, and/or an electrical or thermal conductivity of the 3D printing material.

Proceeding therefrom, the physical behavior of the workpiece WS in the supplemented form is simulated by means of the simulation model. In this case, the physical properties of the 3D printing material are taken into consideration specifically by location in the ascertained spatial area. In dependence thereon it is established whether and to what extent the simulated physical behavior of the workpiece WS in the supplemented shape meets the requirements placed.

In particular the intended shape of the workpiece WS can be selected as the supplemented shape. Besides the intended shape, however, one or more alternative supplemented shapes can also be selected and simulated as described above. An alternative supplemented shape can be selected in particular if an additively supplemented intended shape does not, according to the simulation, meet the requirements placed or if the alternative supplemented shape, according to the simulation, meets the requirements placed better than an additively supplemented intended shape. In particular, it is possible to deviate from the intended shape, for example, to compensate for a lower resilience of the 3D printing material. If multiple supplemented shapes are simulated, that supplemented shape can be selected for the processing of the workpiece WS which best meets the requirements placed.

If the requirements placed are not met by any of the simulated supplemented shapes, the workpiece WS is automatically discarded by the repair unit RE as nonrepairable and discharged from the manufacturing facility FA.

Otherwise, the workpiece WS is passed on in the present exemplary embodiment to a 3D printer 3DPR of the repair unit RE. The 3D printer 3DPR is used for the additive supplementing of the workpiece WS in a second phase P2 of the repair. A so-called powder bed method can be used for the 3D printing, for example, which is used in particular in the production or additive processing of metal components. The additive processing can also comprise laser melting and/or laser sintering here.

In the second phase P2, the workpiece WS is enlarged at least up to the supplemented shape by applying 3D printing material DM by means of the 3D printer 3DPR. Subsequently, the additively enlarged workpiece WS is passed on in the present exemplary embodiment to a cutting machine tool FS of the repair unit RE. The cutting machine tool FS is used for the subtractive processing of the workpiece WS in a third phase P3 of the repair. The subtractive processing can in particular comprise machining, milling, drilling, grinding, cutting, and/or turning. The cutting machine tool FS is implemented in the present exemplary embodiment as a milling machine. In the third phase P3, the workpiece WS is converted from the shape enlarged by the 3D printer 3DPR by milling off excess 3D printing material DM and if necessary other protruding material into the provided supplemented shape.

It can then be checked by means of the sensor system S whether the workpiece WS has actually been brought into the supplemented shape. If this is not the case, the workpiece WS can again be additively and/or subtractively postprocessed.

It is to be noted that the sequence of the phases P2 and P3 or the sequence of the additive and subtractive processing steps does not have to be defined a priori and can deviate from the above description sequence in particular in dependence on the simulation results. In particular, it is also possible to run through each of the additive and subtractive phases P2 and P3 multiple times and in a different sequence. In particular a respective processing step can be checked by means of the sensor system S as to whether and/or to what extent the workpiece WS also actually achieves a shape sought by the respective processing step.

In the present exemplary embodiment, the workpiece WS repaired by additive and subtractive processing is passed on to the machine tool WM2 for further processing or output directly as a finished workpiece WS.

FIG. 2 shows a block diagram of the repair unit RE, to which the workpiece WS was transferred for checking and possibly for repair.

For the specific checking and repair of the workpiece WS, the repair unit RE reads in a CAD model (CAD: computer aided design) of the workpiece WS from a database DB. The CAD model CADM specifies, in addition to other constructive and/or physical features of the workpiece WS, in particular its geometric intended shape by way of corresponding CAD data CAD, i.e., by construction data sets in a CAD format. The CAD model CADM or the CAD data CAD comprise in particular a discretized grid model GS of the workpiece WS in its intended shape. The workpiece WS is specified in its planned intended shape by the grid model GS.

Furthermore, a numeric simulation model SIM of the workpiece WS is also read in from the database DB. By means of the simulation model SIM and the CAD data CAD from the CAD model CADM, a digital twin DT of the workpiece WS is then generated. Such a digital twin is to behave virtually as similarly as possible to its real counterpart. This behavior is generally simulated by means of a simulation model. In the present exemplary embodiment, the numeric simulation model SIM is used to simulate a physical behavior of the workpiece WS, in particular a mechanical behavior, a dynamic behavior, an elasticity, a mechanical resilience, natural frequencies, a cooling functionality, and/or a thermal behavior of the workpiece WS. The simulation can be carried out by means of a finite element method, for which a plurality of numeric standard methods is available. On the basis of the virtual simulated behavior of the digital twin DT, a behavior of the real workpiece WS can thus be predicted, assessed, and/or analyzed.

In addition, a requirement specification REQ about one or more technical requirements to be met by the workpiece WS is read in from the database DB. The requirement specification REQ can relate in this case to requirements on the workpiece WS with respect to a spatial structure, its dimensions, a resilience, an elasticity, a durability, a dynamic behavior, its natural frequencies, its physical, chemical, thermal, or electrical properties, its function, and/or other boundary conditions or secondary conditions. The requirement specification REQ can in particular comprise specifications in the form of tolerance ranges or threshold values.

To ascertain the present shape of the workpiece WS, it is scanned by means of the sensor system S. The resulting scanning results are output in the form of scan data SCD by the sensor system S. The scan data SCD specify the present shape of the workpiece WS, for example, as a point cloud or by data sets in the STL format (STL: stereolithography).

The scanning data SCD are transferred from the sensor system S to a comparison model CMP. In addition, the CAD data CAD from the CAD model CADM are also supplied to the comparison module CMP. On the basis of the scanning data SCD and the CAD data CAD, the comparison module CMP compares the present shape of the workpiece WS to its intended shape. If a deviation is established in this case, the comparison model CMP generates a difference body between the intended shape and the present shape. The difference body is specified by a difference body data set DF, in the STL format or in another CAD data format.

The difference body data set DF is transmitted by the comparison module CMP to a morphing module MO. In addition, the grid model GS of the workpiece WS in the intended shape is also supplied by the digital twin DT to the morphing module MO. The morphing module MO adapts the grid model GS to the acquired present shape of the workpiece WS in that the grid model GS is converted by morphing on the basis of the difference body data set DF into an adapted grid model GA specifying the present shape of the workpiece WS. The adapted grid model GA is transmitted by the morphing module MO to the digital twin DT. The simulation of the digital twin DT or the workpiece WS in the present shape is then carried out on the basis of the adapted grid model GA, by means of a finite element method discretized to the adapted grid model GA.

To establish whether the workpiece WS in the present shape meets the requirements placed on the workpiece WS, simulation data SD about the simulated behavior of the workpiece WS are transmitted by the digital twin DT to an analysis module AM. The simulation data SD specify for this purpose the simulated physical behavior of the workpiece WS. Furthermore, the adapted grid model GA and the requirement request REQ specifying the requirements are also supplied to the analysis module AM. It is checked by the analysis module AM on the basis of the simulation data SD, on the basis of the adapted grid model GA, and on the basis of the requirement specification REQ whether and/or to what extent the workpiece WS would meet the requirements in the present shape. It can be checked in this case, for example, whether natural frequencies or a resilience of the workpiece WS in the present shape are within provided tolerance ranges or not.

If it is established by the analysis module AM that the workpiece WS in the present shape meets the requirements, the analysis module AM decides that the workpiece WS will be left in the present shape and prompts the repair unit RE to pass on the workpiece WS to the machine tool WM2 for further processing or to output it directly as a finished workpiece.

If it is established by the analysis module AM that the requirements are not met by the workpiece WM in the present shape, the analysis module AM checks by means of the digital twin DT whether and/or to what extent the workpiece WS would meet the requirements placed after a repair by additive and/or subtractive processing. For this purpose—as already mentioned above—an additively supplemented shape of the workpiece WS, derived from the intended shape, is ascertained by the analysis module AM, which can be generated by additive application of 3D printing material and possibly by additional subtractive processing. It is checked in particular here whether the present shape may be supplemented to form the intended shape by additive application. In this case, the intended shape can be selected as the supplemented shape.

The supplemented shape is specified in a discretized manner by a grid model GE of the supplemented shape. In the grid model GE, one or more physical properties of the 3D printing material are associated specifically by location with a spatial area to be filled using 3D printing material.

The grid model GE is transmitted by the analysis module AM to the digital twin DT. A physical behavior of the digital twin DT or the workpiece WS in the supplemented shape is then simulated on the basis of the grid model GE. As already mentioned above, the physical properties of the 3D printing material in the ascertained spatial area are taken into consideration specifically by location for this purpose. The resulting simulation data SD specifying the physical behavior are then transmitted by the digital twin DT to the analysis module AM and evaluated therein as to whether and/or to what extent the simulated physical behavior of the workpiece WS in the supplemented shape would meet the requirements placed.

The above steps can also be executed for various supplemented shapes.

If the requirements placed are not met by any of the simulated supplemented shapes, the analysis module AM decides that the workpiece WS is to be discarded as nonrepairable and prompts the repair unit RE to discharge the workpiece WS from the manufacturing facility FA.

If at least one supplemented shape meets the requirements placed, the associated simulation data SD, the associated adapted grid model GA, and the grid model GE of this supplemented shape are transmitted by the analysis module AM to a planning and control module PL.

The planning and control module PL is used in particular to ascertain a sequence of additive supplementation steps and subtractive processing steps, to ascertain a tool path, and/or to ascertain a tool in dependence on the present shape, in dependence on the supplemented shape, and/or in dependence on the simulation data SD. In addition, the planning and control module PL is used to activate the additive and subtractive machine tools 3DPR and FS according to the ascertained repair strategy.

The planning and control module PL can ascertain the repair strategy on the basis of a difference body between the present shape and the supplemented shape of the workpiece WS. If the difference body indicates that the present shape is located completely inside the supplemented shape, the associated difference body data set can be used directly as an input for the additive supplementation.

If the difference body indicates that the supplemented shape is located completely inside the present shape, minimum thicknesses of the difference body can be calculated and compared to minimum removable layer thicknesses. If a minimum thickness of the difference body is less than a minimum removable layer thickness, the difference body can be enlarged accordingly. The enlarged difference body can then be used as an input for the 3D printer. After the required additive application, the workpiece WS can then be brought into the desired shape in the subtractive processing step by the subtractive processing while maintaining minimal removable layer thicknesses.

If the difference body indicates that both the present shape protrudes beyond the supplemented shape and the supplemented shape protrudes beyond the present shape at various points, the planning and control module PL can ascertain a combination of the above processing steps.

According to the generated repair strategy, the planning and control module PL activates the 3D printer 3DPR and the milling machine FS for additive and subtractive processing of the workpiece WS.

A respective present shape of the workpiece WS is progressively acquired by the sensor system S during the additive and subtractive processing of the workpiece WS or after a respective additive or subtractive processing step. On the basis of the respective presently acquired shape, the grid model GA and in particular the digital twin DT as well as the simulation are progressively adapted to the real workpiece WS. After each processing step, the workpiece WS can be simulated again in the respective presently processed shape, and a new supplemented shape can be ascertained if necessary for this purpose. If a new supplemented shape is ascertained, the repair strategy can be modified during the repair. Changes in the processing process, e.g., with respect to a printing speed, a printing temperature, or a milling speed can also be taken into consideration here.

Furthermore, it can be provided that the planning and control module PL prompts a machine tool of the manufacturing facility FA to modify subsequently provided processing steps in dependence on the simulation data SD and the grid models GA and GE.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for repairing a workpiece, said method comprising:
    reading in a requirement specification about a requirement to be met by the workpiece;
    acquiring a present shape of the workpiece by a sensor;
    determining that the present shape of the workpiece deviates from a specified intended shape of the workpiece and in response, simulating, by a simulation model, the physical behavior of the present shape;
    determining whether the simulated physical behavior of the present shape meets the requirement, and if so then leaving the workpiece in the present shape, and if not then ascertaining whether the workpiece would meet the requirement if repaired by additive application of 3D printing material;
    if said ascertaining ascertains that the workpiece would meet the requirement if repaired by the additive application of the 3D printing material then repairing the workpiece by the additive application of the 3D printing material in a spatial area of the workpiece to perform a conversion of the workpiece into a supplemented shape, wherein the spatial area is associated with one or more physical properties of the 3D printing material;
        if said ascertaining ascertains that the workpiece would not meet the requirement if repaired by the additive application of the 3D printing material then discarding the workpiece as nonrepairable.

2. The method as claimed in claim 1, said method comprising:
    performing a subtractive process on the workpiece to assist the conversion of the workpiece into the supplemented shape.

3. The method as claimed in claim 1, wherein a difference body between the intended shape and the present shape is ascertained, a grid model of the intended shape is adapted to the present shape based on the difference body, and said simulating the physical behavior of the workpiece in the present shape is carried out based on the adapted grid model.

4. The method as claimed in claim 1, wherein a grid model of the intended shape is converted by morphing a difference body between the intended shape and the present shape into a grid model of the present shape and/or into a grid model of the supplemented shape.

5. The method as claimed in claim 1, wherein the spatial area is to be filled using the 3D printing material and is ascertained in a grid model of the supplemented shape, a physical property of the one or more physical properties of the 3D printing material is associated by location with the spatial area, and in said simulating the physical behavior of the workpiece in the supplemented shape, the physical property of the 3D printing material is taken into consideration by location.

6. The method as claimed in claim 1, wherein a digital twin of the workpiece is generated by means of the simulation model, and the digital twin is adapted to a presently ascertained shape of the workpiece, to an additively supplemented or subtractively processed shape of the workpiece, and/or by location to a physical property of the one or more physical properties of the 3D printing material.

7. The method as claimed in claim 6, wherein the digital twin is adapted progressively during the additive supplementation and/or the subtractive processing of the workpiece.

8. The method as claimed in claim 2, wherein to perform the conversion of the workpiece into the supplemented shape, a sequence of additive supplementation steps and subtractive processing steps, a tool path, and/or a tool is ascertained in dependence on the present shape, the supplemented shape, and/or a simulation result of said simulating.

9. The method as claimed in claim 1, wherein processing steps of a manufacturing chain provided subsequently for the workpiece are modified in dependence on the present shape, the supplemented shape, and/or a simulation result of said simulating.

10. An arrangement for repairing a workpiece, configured to execute the method as claimed in claim 1.

11. A computer program product, comprising a non-transitory computer readable hardware storage device having computer readable program code stored therein, said program code executable by a processor of a computer system to implement a method, configured to execute the method as claimed in claim 1.

12. A non-transitory computer-readable memory medium having the computer program product as claimed in claim 11.

13. The method as claimed in claim 1, wherein the simulated physical behavior of the present shape does not meet the requirement.

14. The method as claimed in claim 1, wherein said ascertaining ascertains that the workpiece would meet the requirement if repaired by the additive application of the 3D printing material.

* * * * *